DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 12

T920,016

MAGNETIC RECORDING MATERIALS

Arthur John Holloway, Bengeo, and Graham George Turner, Sandy, England, assignors to Imperial Chemical Industries Limited, London, England

Filed Aug. 21, 1973, Ser. No. 390,303

Claims priority, application Great Britain, Sept. 1, 1972, 40,672/72

Int. Cl. H01f *10/00*

U.S. Cl. 117—235

No Drawing. 14 Pages Specification

A magnetic recording material, which comprises a molecularly oriented and heat set polyester film base having a coating comprising vinyl chloride polymer particles on one surface and a magnetic coating on the other surface, the vinyl chloride polymer particle coating having a coat weight of 0.01 to 1.4 mg. dm.$^{-2}$. The material is made by coating the surface of the polyester film base with the vinyl chloride polymer particles during or after the orientation and heat setting. Preferably the final coat weight of the vinyl chloride polymer particle coating is from 0.05 to 0.25 mg. dm.$^{-2}$ and the average size of agglomerated vinyl chloride polymer particles in the final coating is from 10 to 15 microns.